United States Patent [19]

Ogihara

[11] Patent Number: 5,697,154
[45] Date of Patent: Dec. 16, 1997

[54] METHOD OF PRODUCING A FLUID INJECTION VALVE

[75] Inventor: Yoshimi Ogihara, Toyohashi, Japan

[73] Assignee: Nippondenso Co., Ltd., Japan

[21] Appl. No.: 389,453

[22] Filed: Feb. 16, 1995

[30] Foreign Application Priority Data

Feb. 16, 1994 [JP] Japan .................................. 6-019689
Sep. 20, 1994 [JP] Japan .................................. 6-224649

[51] Int. Cl.$^6$ .................................................. B23P 15/00
[52] U.S. Cl. ........................... 29/890.142; 29/890.124; 29/890.128; 29/890.132
[58] Field of Search ................... 29/890.142, 890.124, 29/890.126, 890.127, 890.128, 890.13, 890.132, 407

[56] References Cited

U.S. PATENT DOCUMENTS 4,733,823  3/1988  Waggener et al. .
4,808,260  2/1989  Sickafus et al. .
5,239,751  8/1993  Kanamaru et al. ............... 29/890.142

*Primary Examiner*—Irene Cuda
*Attorney, Agent, or Firm*—Cushman Darby & Cushman Intellectual Property Group of Pillsbury Madison & Sutro, LLP

[57] ABSTRACT

A fluid injection valve in which an orifice plate is produced by defining surfaces of walls forming an orifice on a plate-like basic material by pressing with a punch, forming a protective layer on a surface of the basic material, grinding a surface of the basic material to form an opening portion of the orifice at a predetermined opening value by measuring an amount of light passing through the orifice, and removing the protective layer in a tank filled with weak hydrochloric acid. It is possible to manufacture a fluid injection valve which has excellent fluid injection characteristics and injection quantity adjustment easily and with less expense.

10 Claims, 12 Drawing Sheets

METHOD OF PRODUCING A FLUID INJECTION VALVE

CROSS REFERENCE TO RELATED APPLICATION

The present invention is based on and claims priority from Japanese application Nos. 6-19689 filed on Feb. 16, 1994 and 6-224649 filed on Sep. 20, 1994, the subject matter of which are hereby incorporated herein by reference.

BACKGROUND OF THE INVENTION

1. Field of the Invention

The present invention relates to a fluid injection valve and a method of producing the same, and is applied to, for example, an automotive electromagnetic fuel injection valve for injecting fuel into an internal combustion engine and a method of producing the same.

2. Related Art

Conventionally, method of producing an orifice plate made of silicon and having an orifice for a fuel injection has been known. In this method, an orifice is formed on a silicon plate having a predetermined thickness by etching the silicon plate.

However, in such a method where the orifice is formed by etching the silicon plate, there are problems that it is not possible to form the orifice for adjusting fuel quantity freely and damage is frequently caused while the plate is produced or assembled in the fluid injection valve.

The present invention is made to solve such problems, and an object of the present invention is to provide a fluid injection valve capable of atomizing and injecting fluid and of being produced easily and a method of producing the same.

Another object of the present invention is to provide a fluid injection valve where a shape of a hole through which fuel passes is produced freely and easily and to provide a method of producing the same.

SUMMARY OF THE INVENTION

According to a first aspect of the present invention, a fluid injection valve for injecting fluid includes a needle body having an injection port at one end, a needle for opening and closing the injection port, and an orifice plate disposed at a downstream side of the injection port and having an orifice where fluid injected from said injection port flows, wherein the orifice is formed by pressing.

It is preferable that the orifice plate be produced by defining surfaces of a wall forming the orifice on a plate-like basic material by pressing the material with a punch such that a flowing path area of the orifice decreases gradually toward a downstream portion thereof, and cutting or grinding one surface of the basic material to form an opening portion of the orifice.

It is also preferable that the orifice plate be produced by defining surfaces of a wall forming the orifice on a plate-like basic material by pressing the material with a punch, forming a protective layer on one surface of the basic material, cutting or grinding the one surface of the basic material to form an opening portion of the orifice, and removing the protective layer.

It is also preferable that the orifice plate be produced by defining surfaces of a wall forming said orifice on a plate-like basic material by pressing the material with a first punch, cutting or grinding the one surface of the basic material to form an opening portion of the orifice, and depressing a hollow portion around the orifice with a second punch.

According to the second aspect of the present invention, a method of producing an orifice plate attached to a fluid injection valve having an injection port for injecting fluid, where the orifice plate has an orifice where fluid injected from the injection port flows, includes the steps of defining surfaces of a wall forming the orifice on a plate-like basic material by pressing the material with a punch so that a flowing path area of the orifice decreases gradually toward a downstream portion thereof, and process for cutting or grinding one surface of the basic material to form an opening portion of the orifice.

It is preferable that the steps of forming a protective layer on one surface of the basic material after defining the surfaces of the wall and removing the protective layer after cutting or grinding the one surface of the basic material be included in the above method. According to these embodiments, it is possible to manufacture a fluid injection valve which has excellent fluid injection characteristics and injection quantity adjustment easily and with less expense.

BRIEF DESCRIPTION OF THE DRAWINGS

Other objects, features and characteristics of the present invention as well as the functions of related parts will become clear from a study of the following detailed description, the appended claims, and the drawings. In the accompanying drawings:

DETAILED DESCRIPTION OF THE PREFERRED EMBODIMENTS

FIRST EMBODIMENT

Figure 1:
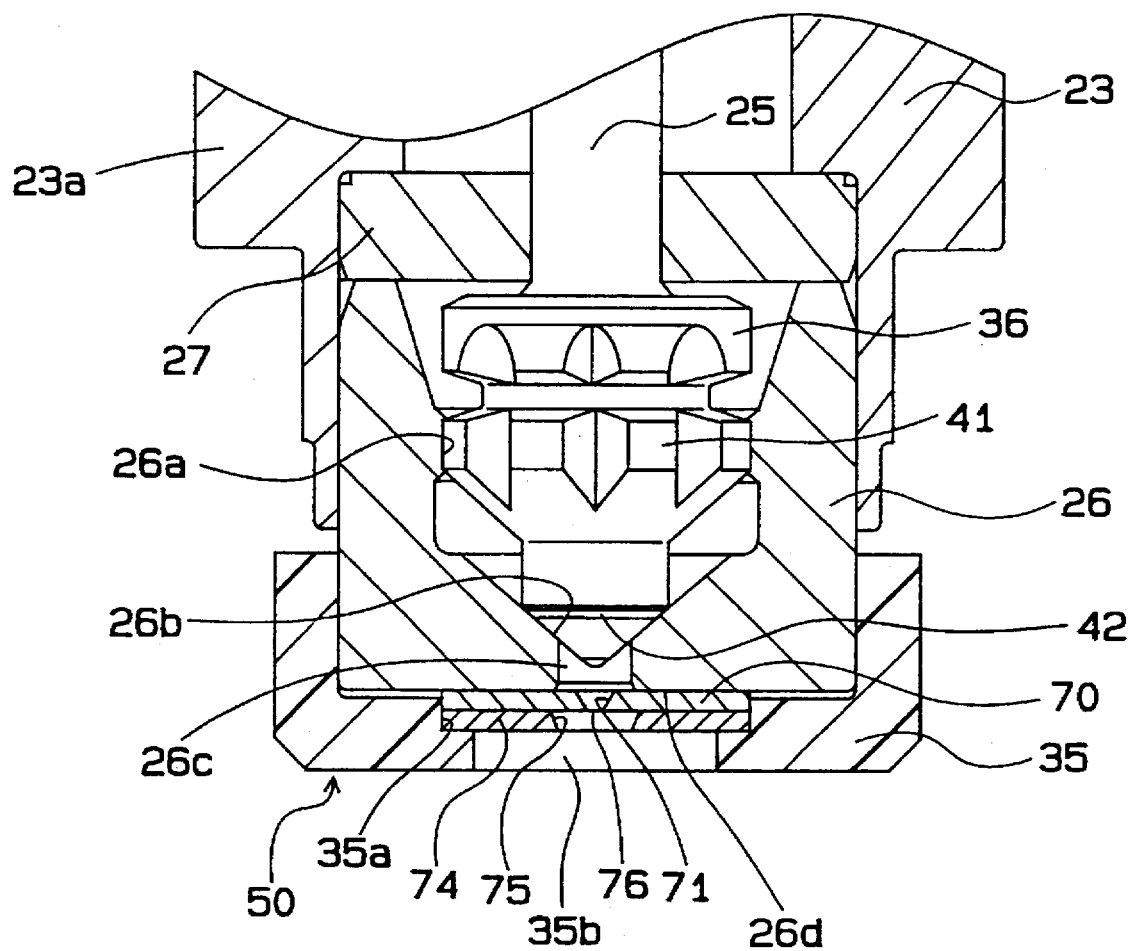
FIG. 1 is an enlarged cross sectional view of an injection port of fuel injection valve shown in FIG. 2.
Figure 2:
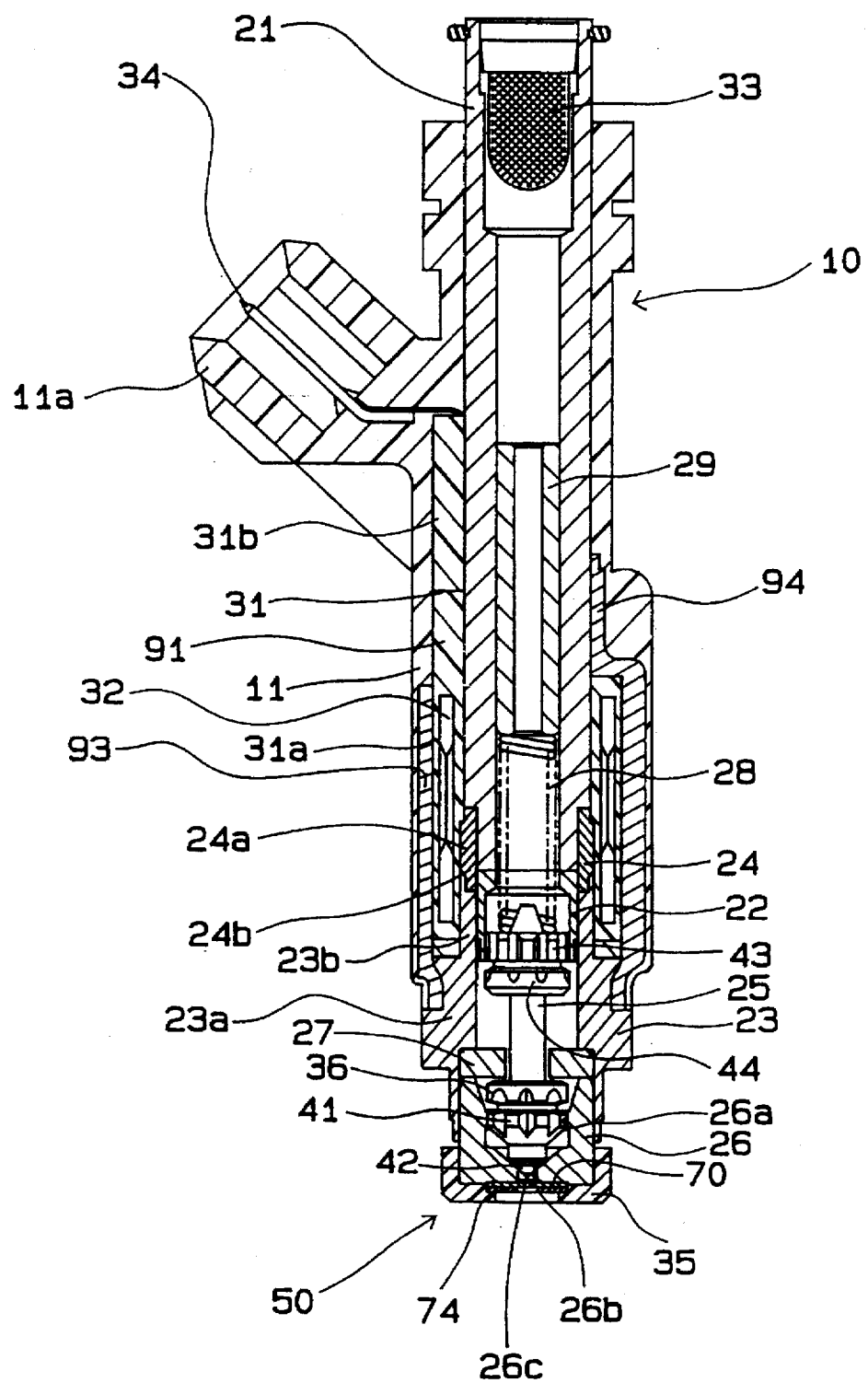
FIG. 2 is a cross sectional view showing a fuel injection valve according to first embodiment of the present invention.
Figure 3:
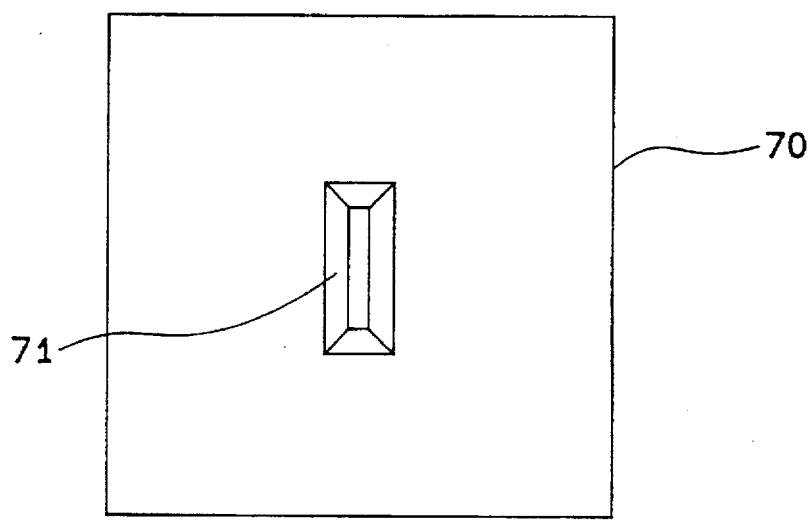
FIG. 3 is a plan view showing the orifice plate in the first embodiment.

A first embodiment in which the present invention is applied to an injection valve of a fuel supply apparatus for a gasoline engine is described with respect to FIGS. 1-3.

As shown in FIG. 2, stationary core 21, spool 91, electromagnetic coil 32, coil mold 31, and metal plates 93 and 94 forming a magnetic path are molded as an unit in housing 11, made of resin, of fuel injection valve 10.

Stationary core 21 is made of ferromagnetic material and disposed so as to extend form an upper end of coil mold 31 in housing 11. Guiding pipe 29 is fixed in an inner wall of stationary core 21.

Electromagnetic coil 32 is wound around spool 91 made of resin, subsequently coil mold 31 is formed around spool 91 and electromagnetic coil 32, and electromagnetic coil 32 is surrounded by coil mold 31. Coil mold 31 includes a cylindrical portion 31a covering electromagnetic coil 32 and extruding portion 31a covering a leading wire form electromagnetic coil 32, holding terminal 34 and extending from cylindrical portion 31a. Spool 91 and electromagnetic coil 32 are wound around stationary core 21 while being molded as a unit by coil mold 31.

Two metal plates 93 and 94 are disposed so as to contact a circumferential surface of stationary core 21 at one upper end of the plates and a circumferential surface of magnetic pipe 23 at the lower end thereof. Metal plates 93 and 94 form a magnetic path passing magnetic flux when electricity is supplied to electromagnetic coil 32, and cover cylindrical portion 31a to hold it from both sides. Thus, the electromagnetic coil 32 is covered with the two metal plates 93 and 94.

At an upper end of housing 11, connecting portion 11a is provided to extend from an outer wall of housing 11. Terminal 34, which is electrically connected to the electromagnetic coil 32, is embedded in connecting portion 11a and coil mold 31. Terminal 34 is connected to an electronic control apparatus (not shown) via a wire harness (not shown).

One end of compression coil spring 28 abuts an upper end of needle 25, which is connected to movable core 22 by welding, and the other end of compression coil spring 28 abuts a bottom portion of guiding pipe 29. Compression coil spring 28 biases movable core 22 and needle 25 downwardly in FIG. 2, and seats seat portion 42 of needle 25 on valve seat 26b of needle body 26. An electronic control apparatus (not shown) supplies electricity to electromagnetic coil 32 through terminal 34, so that needle 25 and movable core 22 are moved toward stationary core 21 while resisting the spring pressure force exerted by compression coil spring 28.

Non-magnetic pipe 24 is connected to a lower portion of stationary core 21, and is formed as a stepped pipe having a large-diameter portion 24a and a small diameter portion 24b. Large-diameter portion 24a is connected to a lower portion of stationary core 21 so that one portion extends from a lower end of stationary core 21. Small-diameter portion 23b of magnetic pipe 23 formed as a stepped pipe is connected to a lower end of small-diameter portion 24b of non-magnetic pipe 24. An inner diameter of small-diameter portion 24b of non-magnetic pipe 24 is set to be slightly smaller than that of small-diameter portion 23b of magnetic pipe 23, and guides movable core 22.

Movable core 22 made of magnetic material and formed in a cylindrical shape is disposed in an interior space of nonmagnetic pipe 24 and magnetic pipe 23. An outer diameter of movable core 22 is set to be slightly smaller than an inner diameter of small-diameter portion 24b of non-magnetic portion 24, so that movable core 22 is slidably disposed in nonmagnetic pipe 24. Movable core 22 is disposed so that an upper end thereof faces a lower end of stationary core 21 so as to form a predetermined gap.

Brim-shaped connecting portion 43 is formed on an upper portion of needle 25. Connecting portion 43 and movable core 22 are connected as an unit by laser welding. Flange 44 is formed below connecting portion 43. A plurality of knurled grooves for fuel passages are formed on an outer circumferential surface of connecting portion 43 and flange 44.

Filter 33 is provided in an upper portion of stationary core 21 and removes extraneous materials such as particulate matter in fuel, which is supplied to fuel injection valve 10 from a fuel tank (not shown) under a pressure by a pumping apparatus (not shown) such as a fuel pump.

Fuel flowing into stationary core 21 from filter 33 passes through guiding pipe 29, the gap between movable core 22 and the knurled grooves formed on connecting portion 43 of needle 25, and gap between cylindrical surface 26a of needle body 26 and knurled grooves formed on guiding portion 41 of needle 25, and is led to a valve portion including seat portion 42 of a tip end of needle 25 and valve seat 26b and further to injection port 26c from the valve portion. Fuel is injected from through hole 35b of sleeve 35 (shown more clearly in FIG. 1) through first orifice 71 of first orifice plate 70 and second orifice 75 of second orifice plate 74. Discharge portion 50 of fuel injection valve 10 is described with respect to FIG. 1.

Needle body 26 is inserted and fixed within large diameter portion 23a of magnetic pipe 23 by laser welding so as to hold therebetween round-shaped spacer 27 having a through hole. A thickness of spacer 27 is adjusted so as to keep a length of an air gap between stationary core 21 and movable core 22 at a predetermined value. Cylindrical surface 26a where guiding portion 41 of needle 25 slides and valve seat 26b where cylindrical seat portion 42 seats are formed on an inner wall of needle body 26. Injection port 26c is formed at the center of the bottom portion of needle body 28.

Flange 36 is formed on needle 25 such that flange 36 faces a lower end surface of spacer 27, which is accommodated by an inner wall of large-diameter portion 23a of magnetic pipe 23 to form a predetermined gap between needle 25 and magnetic pipe 23. Flange 36 is formed on needle 25 at an upper side of seat portion 42 formed on the tip end of needle 25. Guiding portion 41 which slides on cylindrical surface 26a formed on needle body 26 is formed below flange 36.

A plurality of knurled grooves are formed on an outer circumferential surface of connecting portion 43, formed on flange 36, and formed on guiding portion 41 by a rolling process, or the like.

Sleeve 35 made of synthetic resin in the form of a cylinder with a solid bottom end is fixedly fit around a bottom portion of the outer circumferential wall of needle body 26. Accommodating hole 35a is formed at the center of sleeve 35, and through hole 35b is formed subsequently to accommodating hole 35a.

First orifice plate 70 is mounted on needle body 26 at a front side of injection port 26c, and second orifice plate 74 is disposed on a downstream side thereof. These orifice plates 70 and 74 are fixed water tightly to end surface 26d of needle body 26, and sleeve 35 is fixedly fit around needle body 26 by pressure to protect orifice plates 70 and 74.

First orifice plate 70 is made of metal, and, as shown in FIG. 3, first orifice 71 is formed as slit-like hole at the center portion. Virtually any kind of metal which is corrosion resistant may be used for making orifice plate 701, however, SUS 304 is preferable in view of its light weight and ability to be formed easily. First orifice 71 has a long and narrow straight shape and is a through hole tapering off towards a downstream side thereof where cross-sectional flowing path area becomes smaller gradually in a downward direction shown in FIG. 1 (i.e., in a downstream direction of fuel flow). First orifice 71 is formed by four surfaces including two pairs of facing walls having an isosceles or symmetrical trapezoidal shape, and a rectangular opening shape formed by the walls at an upper side flat surface is larger than rectangular opening shape formed by the walls at a lower side flat surface of first orifice plate 70

Second orifice plate 74 is preferably made of SUS 304 and is formed in the same shape as first orifice plate 70. Second orifice 75 is formed as a slit-like hole which has a longitudinal axis is perpendicular to a corresponding axis of first orifice 71. Second orifice 75 is formed as tapers off so that the cross-sectional flowing path area becomes smaller gradually in a downward direction similar to first orifice 71.

First orifice plate 70 and second orifice plate 74 are assembled so that first orifice 71 is disposed perpendicular to second orifice 75 while first and second orifice plates 70 and 74 are mounted on needle body 26. Therefore, a downstream side opening of first orifice 71 is mostly closed by an upstream flat surface of second orifice plate 74, and center portions of first orifice plate 71 and second orifice plate 75 directly communicate with one another.

In FIG. 1, when needle 25 lifts from valve seat 26b of needle body 26, fuel is injected through injection port 26c. Fuel injected through injection port 26c is supplied downwardly after passing through hole 76 where first orifice 71 and second orifice 75 overlap with one another. At that time, some of the fuel passing through first orifice 71 collides with the upstream side flat surface of second orifice plate 74, flows toward through hole 76 along grooves formed by the upstream side flat surface and surfaces of wall forming first orifice 71, changes directions In through hole 76 as a result of fuel flowing from each approach from above colliding with each other, and passes through second orifice 75 while being sprayed out in a longitudinal direction. The sprayed direction of fuel passing through hole 76 where first orifice 71 and second orifice 75 overlap with one another is regulated by two surfaces of the walls which intend in a longitudinal direction among four surfaces of wall forming second orifice 75.

Thus, fuel flowing from first orifice 71 in different directions collide with one another, and are atomized and spread along an atomized path directed by second orifice 75. In the first embodiment, it is possible to obtain a finely-grained fuel atomization using a simple structure where slit-like orifices are formed on two plates, because groove-like approaches are formed by surfaces of walls forming first orifice 71 and upstream side flat surface of second orifice plate 74.

According to the first embodiment, fuel injected through injection port 26c passes through first orifice 71 and second orifice 75, and is injected through hole 35b. The injected fuel is finely atomized to have good atomization characteristics and to have a narrow injection angle in one direction, because injected fuel further passes through second orifice 75 and is throttled by tapering off after passing through first orifice 71 and being throttled by tapering off. Therefore, fuel supplied from an intake port (not shown) to a combustion chamber of an internal combustion engine has good atomized characteristics and can be easily ignited.

A method of producing the first orifice plate 70 is now described with respect to FIGS. 4–13. The second orifice plate 74 can be produced in the same way.

Figure 4:
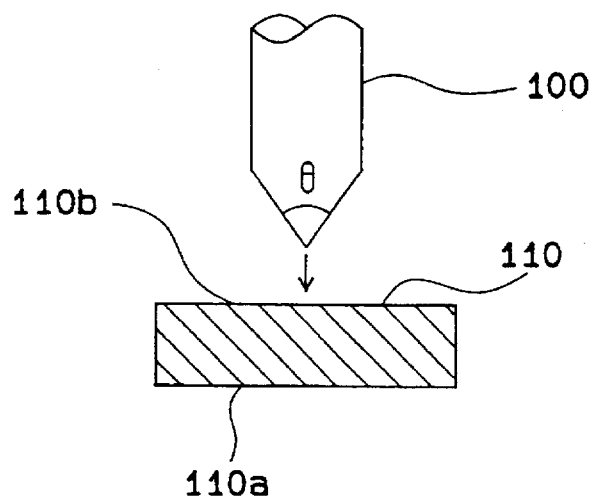
FIG. 4 is a cross sectional view schematically showing a method of producing an orifice plate according to the first embodiment.
Figure 13:
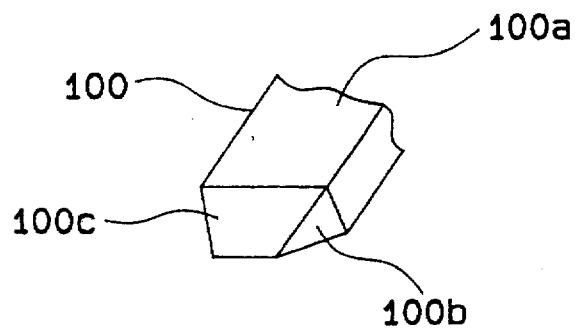
FIG. 13 is a perspective view showing a punch used in the first embodiment.

As shown in FIG. 13, punch 100 has axis portion 100a having a square pillar shape, and a tip end portion 100a of punch 100 has a tapered shape. Two pairs of facing surfaces 100b and 100c have the shape of an isosceles triangle and trapezoid, respectively. Facing surfaces 100c of the isosceles trapezoid together forms a taper angle θ as shown in FIG. 4. As noted above, basic material 110 of first orifice plate 70 is preferably made of SUS 304.

A preferred process for producing first orifice plate 70 is described below.

As shown in FIG. 4, both ends of basic material 110 are supported by a jig (not shown), and punch 100 goes down toward basic material 110 from a side of upper surface 11b in a perpendicular direction.

Figure 5:
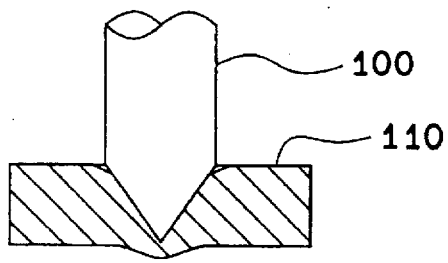
FIG. 5 is a cross sectional view schematically showing a method of producing an orifice plate according to the first embodiment.
Figure 6:
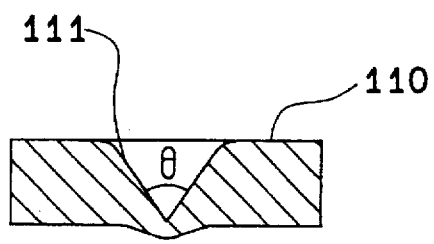
FIG. 6 is a cross sectional view schematically showing a method of producing an orifice plate according to the first embodiment.

As shown in FIG. 5, basic material 110 is pressed by punch 100 to the extent that punch 100 does not pass through basic material 110, thereby forming tapering surface 111 having the same angle of taper angle θ as punch 100. As a result of this process, four walls comprising two pairs of facing surfaces 100b and 100c are formed, and an orifice (hole) is defined by these walls.

Figure 7:
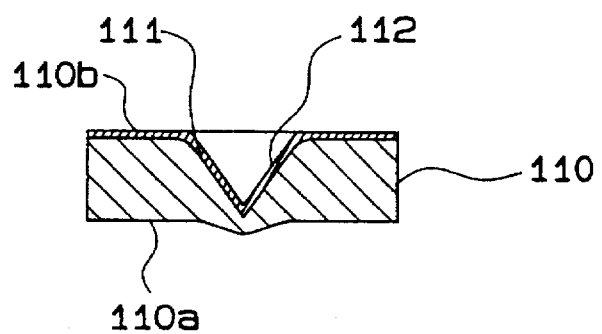
FIG. 7 is a cross sectional view schematically showing a method of producing an orifice plate according to the first embodiment.

As shown in FIG. 7, plating layer 112 is formed on basic material 110 at a side of upper surface 110b. It is preferable that plating layer 112 be formed of comparatively soft metal such as copper, zinc, etc. so that it can be easily removed by a plating removing process in a weak hydrochloric acid tank as described below.

Figure 8:
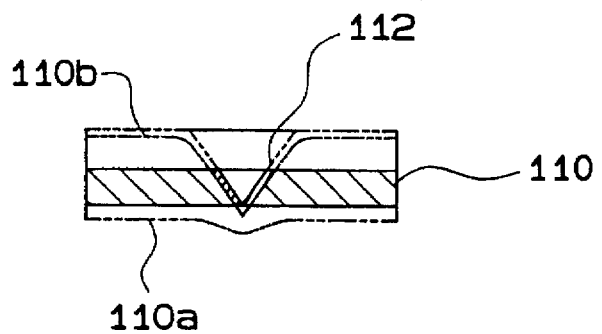
FIG. 8 is a cross sectional view schematically showing a method of producing an orifice plate according to the first embodiment.
Figure 11:
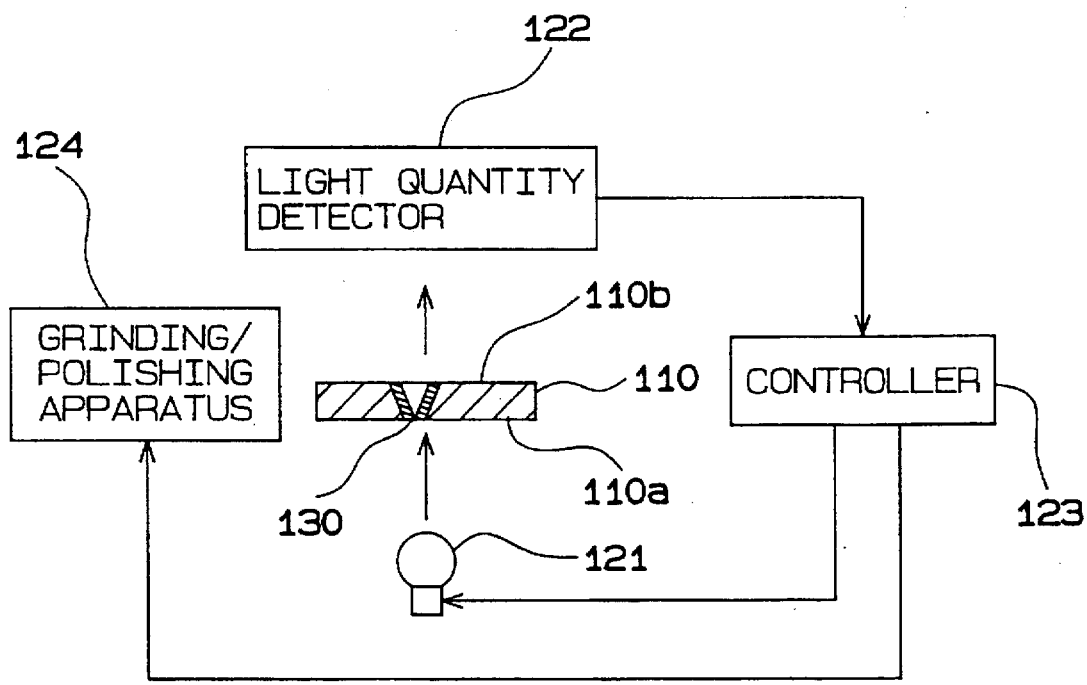
FIG. 11 is a block diagram of a grinding apparatus for an injection port according to the first embodiment.

As shown in FIG. 8, both sides of basic material 110 having plating layer 112 are ground. At that time, basic material 110 is fixed by a vacuum chuck (not shown) holding one side face of basic material 110. Firstly, lower surface 110a, the downstream side flat surface of basic material 110, is ground, thereby defining an opening area of orifice at a downstream side of fuel flow. A system as shown in FIG. 11 is applied to detect the area of the opening while basic material 110 is being ground. A quantity of light leaking from opening portion 130 of the orifice formed at a side of lower surface 110a of basic material 110 by illuminating a ray of light toward lower surface 100a of basic material 110 is detected by light quantity detector 122 disposed at a side of upper surface 110b, upstream side flat surface of basic material 110, while lower surface 110a is being ground by grinding apparatus 124. A light quantity signal generated by light quantity detector 122 is fed to controller 123 which judges whether the light quantity corresponds to the light quantity leaking from a predetermined opening area. During the process, thickness of plating layer 112 is taken into consideration.

Figure 12A:
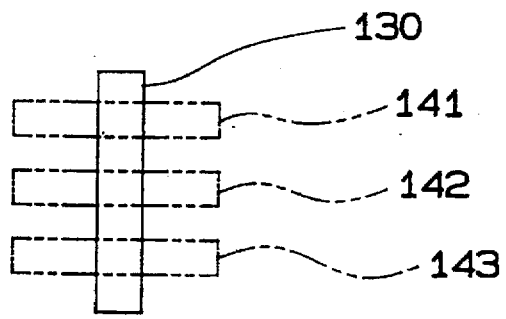
FIG. 12A is an explanatory view schematically showing the sensing region of a light sensor used for light quantity detection in the first embodiment.
Figure 12B:
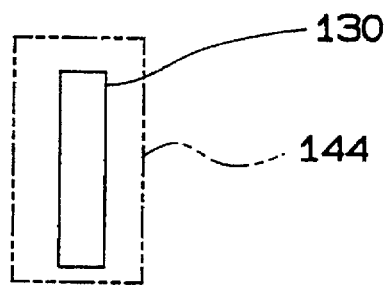
FIG. 12B is an explanatory view schematically showing the sensing region of a light sensor used for light quantity detection in the first embodiment.
Figure 12C:
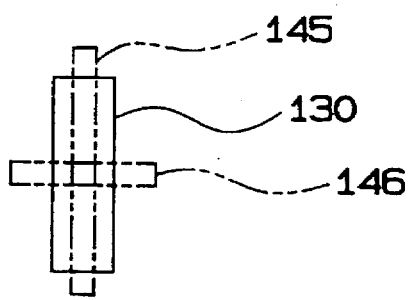
FIG. 12C is an explanatory view schematically showing the sensing region of a light sensor used for light quantity detection in the first embodiment.

The region of light quantity detected by light quantity detector 122 is shown in FIGS. 12A 12C, and it can be seen that the region depends on the relative positions of the light detector and opening. FIG. 12A shows an example where detected regions 141, 142 and 143 are disposed in a longitudinal direction to cover the entire width of opening portion 130. FIG. 12B shows an example where detected region 144 is disposed so as to cover the entire opening portion 130. FIG. 12C shows an example where detected regions 145 and 146 are disposed so that detected region 145 disposed along a vertical axis crosses detected region 146 disposed along a horizontal axis. The light quantity can be detected in all arrangements shown in FIGS. 12A–12C. However, the arrangement shown in FIG. 12A is most preferable for precisely measuring quantity of light leaking from all regions of opening portion 130 when the number of light sensors used for detecting light is reduced.

Figure 9:
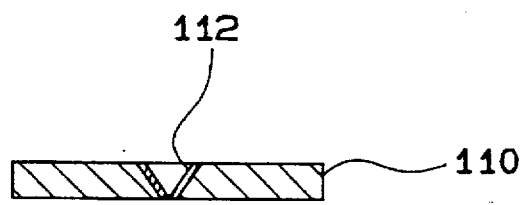
FIG. 9 is a cross sectional view schematically showing a method of producing an orifice plate according to the first embodiment.

After lower surface 110a of basic material 110 is ground so that a predetermined opening area is obtained, upper surface 110b of basic material 110 is ground until a predetermined thickness is obtained as shown in FIG. 9. In this embodiment, first orifice 71 and second orifice 75 are each formed so that the larger the opening area becomes, the more the lower surface is ground, and the grinding process is finished when the predetermined opening area is obtained, because four walls are formed by pressing to form a hole, whose cross sectional flowing path area becomes smaller gradually from an upper surface to a lower surface thereof.

Thereby, an opening area at a lower surface of the orifice for a quantity adjusting portion, which gives a great influence on fuel injection characteristics, is accurately formed.

Figure 10:
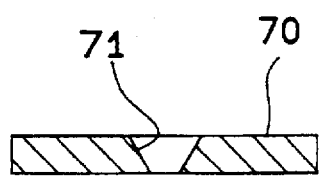
FIG. 10 is a cross sectional view schematically showing a method of producing an orifice plate according to the first embodiment.

After grinding of lower surface 110a and upper surface 110b of basic material 110 has been completed, basic material 110 is soaked in a tank filled with dilute hydrochloric acid to remove plating layer 112, thereby forming first orifice plate 70 as shown in FIG. 10.

According to the above method, it is easy to modify the orifice shape by changing punch 100, because the orifice is formed in a metallic base material by punch 100. The preferable size of the opening area is easily obtained because the grinding operation is adjusted while the size of the opening area is being detected by a light sensor. Therefore, product yield is improved, and orifice plates having preferable injection characteristics may be uniformily and reliably.

In the first embodiment, it is possible that the process for forming plating layer 112 on basic material 110 is performed after both sides of basic material 110 are ground and that process of removing the plating layer 112 described above is performed after plating layer 112 is formed and both sides of basic material 110 are polished.

In the first embodiment, first orifice 71 and second orifice 75 are formed with tapered shapes, however, it is also possible that these orifices are formed with spread-out shapes. In addition, burrs are created where, metal basic material 110 is ground, because metal basic material 110 is ground after tapering surface 111 is covered with plating layer 112, therefore, it is also possible to omit the process for removing burr from metal basic material 110 by removing plating layer 112 in weak hydrochloric acid tank and improving dimensional accuracy.

SECOND EMBODIMENT

Figure 14:
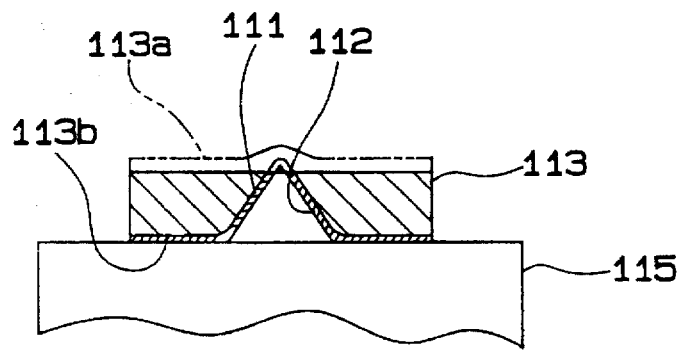
FIG. 14 is a cross sectional view schematically showing a method of producing an orifice plate according to a second embodiment of the present invention.
Figure 15:
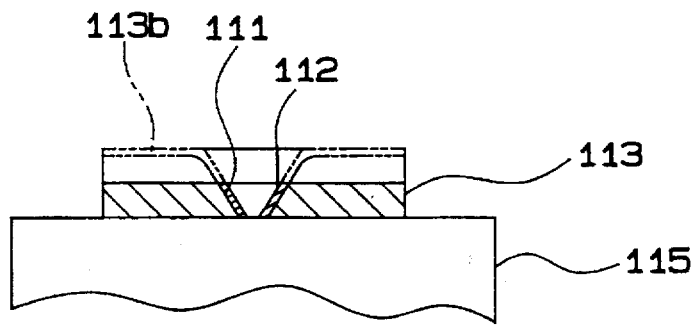
FIG. 15 is a cross sectional view schematically showing a method of producing an orifice plate according to the second embodiment.
Figure 16:
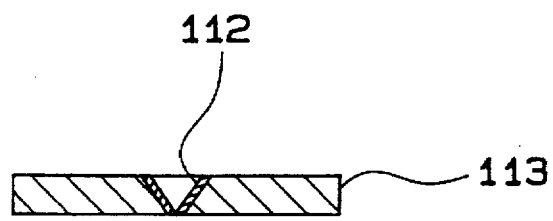
FIG. 16 is a cross sectional view schematically showing a method of producing an orifice plate according to the second embodiment.

A method of producing a second embodiment according to the present invention will be now described with respect to FIGS. 14–16. The structure of the fuel injection valve in the second embodiment is substantially the same as in the first embodiment. However, the first orifice plate 70 and the second orifice plate 74 are made from a plate material made of magnetic SUS instead of non-magnetic SUS 304 as used in the first embodiment.

In the process according to the second embodiment, aside from the use of magnetic SUS instead of non-magnetic SUS 304, only the grinding operation is different from the process described above.

The tapering shape is formed on the basic material 113 by punching and the plating layer is formed on the upper surface of the basic material 113 as in the first embodiment.

As shown in FIG. 14, an upper surface of basic material 113 having plating layer 112 is mounted on a grinding stand 115. An electromagnetic coil (not shown) is disposed below grinding stand 115, and basic material 113 is held to the grinding stand 115 through plating layer 112 because the grinding stand becomes magnetized when electricity is supplied to the electromagnetic coil. Lower surface 113a, the downstream side flat surface of basic material 113, is ground, and the opening area of the orifice formed thereby is determined. A system shown in FIG. 11 in connection with the first embodiment may be used, and the opening area is detected while grinding is being performed. Supply of the electricity to the electromagnetic coil is stopped when the predetermined opening area is obtained, and ground lower surface 113a of basic material 113 is mounted on grinding stand 115. Electricity is supplied to the electromagnetic coil again, and basic material 113 is held to the grinding stand 115. Upper surface 113b, the upstream side flat surface of basic material 113, is ground until the predetermined thickness is obtained as shown in FIG. 16.

First orifice plate 70 and second orifice plate 74 are completed by removing plating layer 112 on basic material 113 in the same way as the first embodiment.

In second embodiment, it is easy to fix basic material 113 on the grinding stand 115 strongly by adjusting the electric voltage supplied to the electromagnetic coil, compared to the first embodiment where basic material 113 is fixed with a vacuum chuck, because basic material 113 made of magnetic SUS is ground while being magnetically held to grinding stand 115. Therefore, it is possible to exert a greater force on basic material 113 and to shorten the grinding time. It is also easily possible to reduce damage to basic material 113 while it is being ground and to determine the position of basic material 113, because the entire lower surface of basic material 113 is fixed on grinding stand 115.

In the second embodiment, basic material 113 is made of magnetic SUS; however, any magnetic metal that resists fuel corrosion may be used.

THIRD EMBODIMENT

Figure 17:
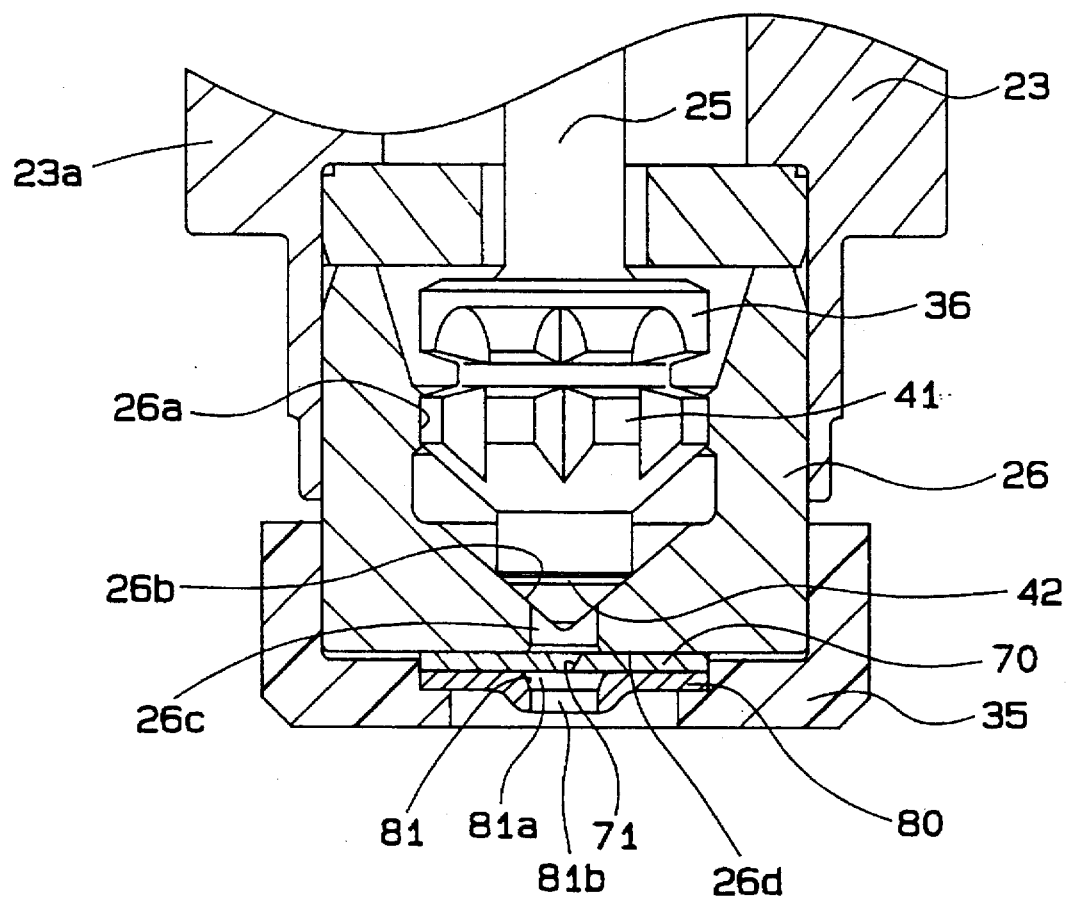
FIG. 17 is an enlarged cross sectional view of an injection port of fuel injection valve shown in FIG. 18.
Figure 18:
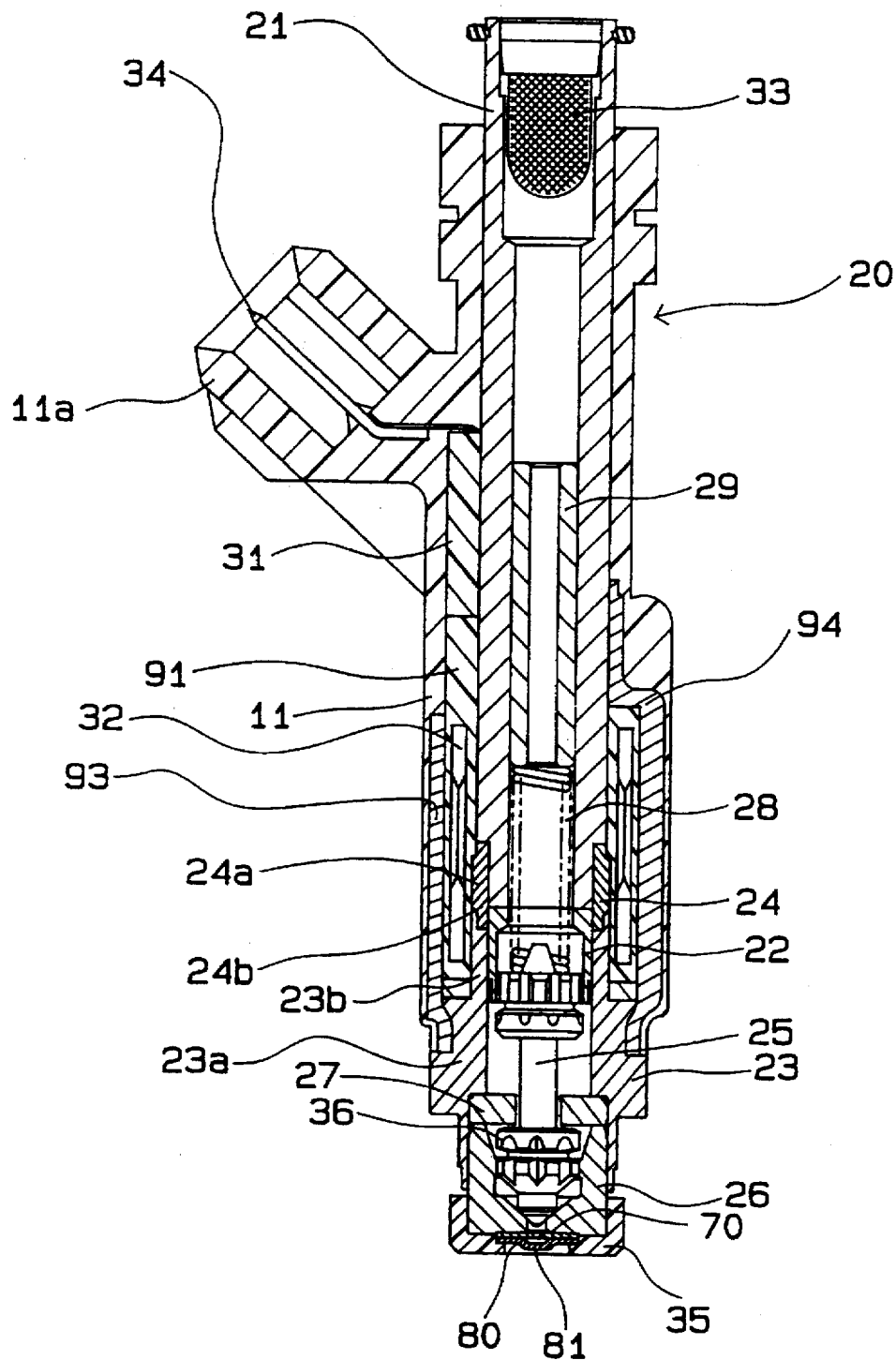
FIG. 18 is a cross sectional view showing a fuel injection valve according to a third embodiment of the present invention.
Figure 19:
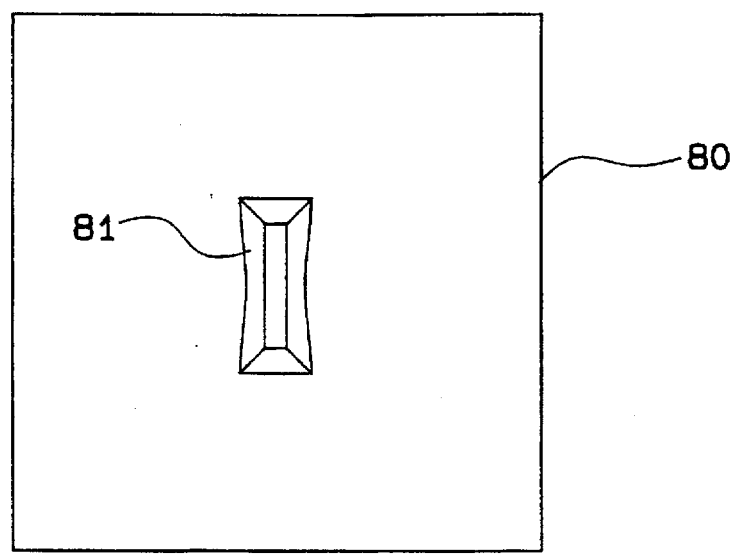
FIG. 19 is a plan view showing an orifice plate in the third embodiment.

A third embodiment in which the present invention is applied to an injection valve of a fuel supply apparatus for a gasoline engine is described with respect to FIGS. 17–19.

First orifice plate 70 and second orifice plate 80 are made of metal, and second orifice plate 80 is disposed proximate to a lower surface of first orifice plate 70. Second orifice plate 80 is hollow at its center portion and has a slit-like second orifice 81 extending along an axis perpendicular to an axis of slit-like first orifice 71. Second orifice 81 includes a tapering surface 81a formed as tapering off part of the way while going down and orifice hole 81b which spreads out. First orifice plate 70 and second orifice plate 80 are assembled so that the axis of first orifice 71 is disposed perpendicular to the corresponding axis of second orifice 75 and the portion where first orifice 71 and second orifice 81 overlap forms a direct path in the fuel injection direction when first and second orifice plates 70 and 80 are mounted. First orifice plate 70 is produced in the same way as in the first embodiment.

A method of producing the second orifice plate 80 is described with respect to FIGS. 20–27.

Figure 29:
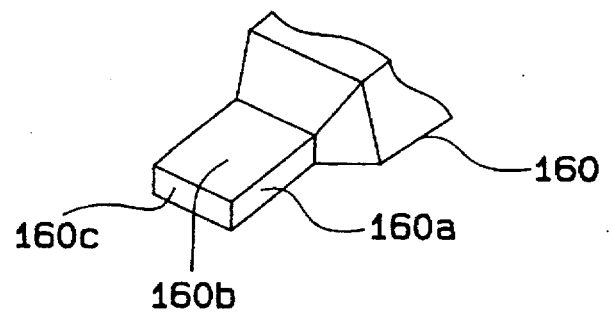
FIG. 29 is a perspective view showing the punch used in the third embodiment.

As shown in FIG. 29, a tip end portion of punch 160 is formed in a flat plate shape having a rectangular cross section and includes two pairs of facing surfaces 160a and 160b which are parallel one another, and tip end surface 160. Basic material 150 of second orifice plate 80 is made of plate material.

A method of producing the second orifice plate 80 is described below.

Figure 20:
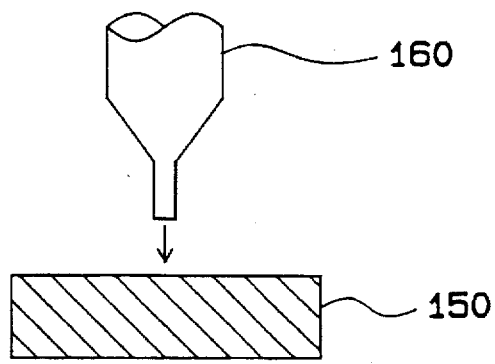
FIG. 20 is a cross sectional view schematically showing a method of producing an orifice plate according to the third embodiment.

As shown in FIG. 20, both ends of basic material 150 are supported by a jig (not shown), and first punch 160 goes down toward basic material 150 from a side of upper surface 110b in a perpendicular direction.

Figure 21:
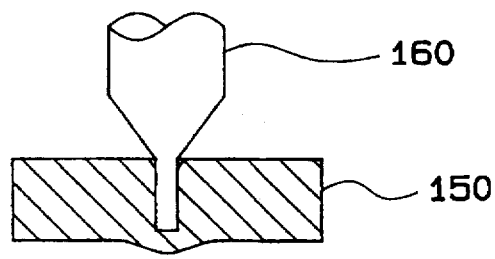
FIG. 21 is a cross sectional view schematically showing a method of producing an orifice plate according to the third embodiment.
Figure 22:
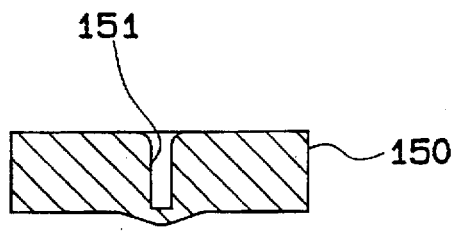
FIG. 22 is a cross sectional view schematically showing a method of producing an orifice plate according to the third embodiment.

As shown in FIG. 21, basic material 110 is pressed by punch 160 so that punch 160 does not pass completely through basic material 110, thereby forming groove 151 having the same shape as the tip portion of first punch 160 as shown in FIG. 22.

Figure 23:
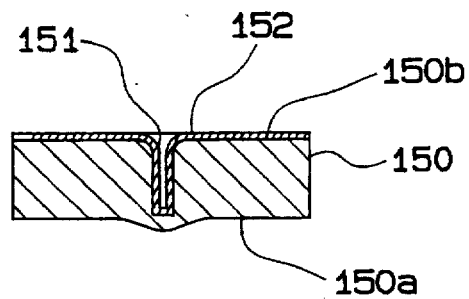
FIG. 23 is a cross sectional view schematically showing a method of producing an orifice plate according to the third embodiment.

As shown in FIG. 23, plating layer 152 is formed on basic material 150 at a side of upper surface 110b which is an upstream side flat surface. It is preferable that plating layer 152 be formed of comparatively soft metal such as copper, zinc, etc. so that it can be easily removed by a plating removing process in a weak hydrochloric acid tank as described later.

Figure 24:
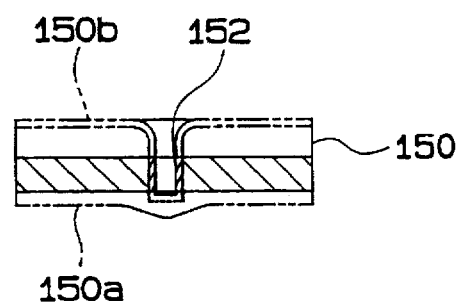
FIG. 24 is a cross sectional view schematically showing a method of producing an orifice plate according to the third embodiment.
Figure 25:
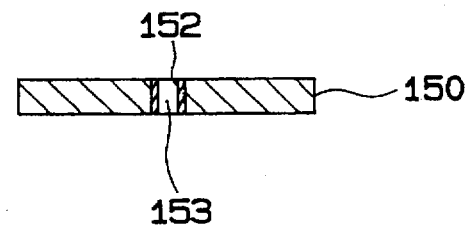
FIG. 25 is a cross sectional view schematically showing a method of producing an orifice plate according to the third embodiment.

As shown in FIG. 24, both sides of basic material 150 having plating layer 152 are ground, and through hole 153 is formed as shown in FIG. 25. At that time, basic material 150 is fixed by a vacuum chuck (not shown) holding one side face of basic material 150. In the third embodiment, whether lower surface 150a as downstream side flat surface or upper surface 150b is ground first is not material to the practice of this invention.

Figure 26:
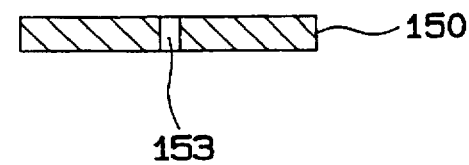
FIG. 26 is a cross sectional view schematically showing a method of producing an orifice plate according to the third embodiment.

After the grinding of lower surface 150a and upper surface 150b of basic material 150 has been completed, basic material 150 is soaked in a tank filled with dilute or weak hydrochloric acid, and plating layer 152 is removed as shown in FIG. 26.

Figure 27:
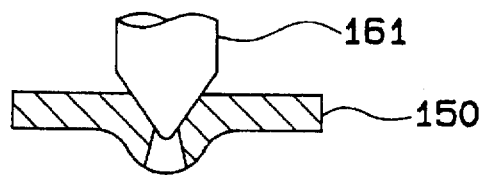
FIG. 27 is a cross sectional view schematically showing a method of producing an orifice plate according to the third embodiment.
Figure 28:
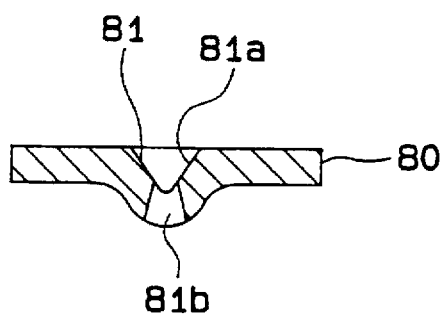
FIG. 28 is a cross sectional view schematically showing a method of producing an orifice plate according to the third embodiment.

As shown in FIG. 27, second punch 161 goes down on a portion of basic material 150 where through hole 153 is formed. Second punch 161 only functions to push and bend basic material 150, because the tip end portion of second punch 161 is formed in curved shape having a rectangular cross section. The tip end is formed as a curved surface to connect smoothly each of the surfaces of punch 100 shown in FIG. 13.

Basic material 150 is pressed by second punch 161 to a predetermined depth, second orifice plate 80 having second orifice plate 81 which includes a tapering surface 81a formed to partially taper off while going down and orifice hole 81b formed reversely therefrom which spreads out.

According to the method for producing the third embodiment, pushing and bending basic material 150 may be varied by only adjusting the degree of pressing quantity of second punch 161, and the shape of second orifice 81 including tapering surface 81a and orifice hole 81b is thereby modified, because second orifice 81 is formed on basic metal material 150 having through hole 153 by pressing with second punch 61. Especially, when the degree of pushing and bending is increased, the opening area of second orifice 81 is adjusted as an adjusting portion for a fuel quantity. Therefore, product yield is improved, and orifice plates having preferable injection characteristics can be uniformily and reliably obtained.

In the third embodiment, it is possible that the steps of forming plating layer 152 on basic material 150 is performed after both sides of basic material 110 are ground and that the step of removing the plating layer 152 described above is performed after plating layer 152 is formed and both sides of basic material 110 are polished. In the third embodiment, it is possible to shorten the grinding time of basic material 150 by using a basic material 150 made of magnetic SUS as in the second embodiment.

Basic material is ground after a groove is formed with a punch in embodiments according to the present invention described above. However, it is also possible to form that groove after the basic material is roughly cut in advance.

In embodiments according to the present invention, the groove is formed by a punch so that the groove does not pass completely through the basic material. However, it is also possible to grind the basic material until a predetermined opening area is obtained after the basic groove is formed to pass through the basic material.

The occurrence of burrs on the basic material is prevented when the basic material is ground by forming the plating layer on the basic material. However, it is also possible to grind the orifice plate without forming a plating layer on the basic material.

In embodiments according to the present invention, the first orifice plate and second orifice plate are assembled. However, it is also possible to assemble three or more orifice plates together. It is not necessary that the orifice is formed as a slit, for it may be square or round.

In embodiments according to the present invention, both sides of the orifice plate are ground with a grindstone.

However, it is also possible to grind both sides of the plate with a bit. It is also possible to form the plating layer before the pressing process, because the plating process need only be performed before the final polishing process.

The present invention has been described in connection with what are presently considered to be the most practical and preferred embodiments. However, the invention is not meant to be limited to the disclosed embodiments, but rather is intended to include all modifications and alternative arrangements included within the spirit and scope of the appended claims.

What is claimed is:

1. A method of manufacturing a fluid injection valve having a needle body including an injection port at one end thereof and a needle selectively opening and closing said injection port, said method comprising the steps of:

providing a basic material having a plate shape;

punching said basic material with a punch having a shape which forms an orifice therein thereby defining an orifice plate;

removing material from a surface of said basic material to form an opening portion of said orifice so that a minimum opening area of said orifice is adjusted; and disposing said orifice plate at a point on a downstream side of said injection port to permit fluid from said fluid injection valve to pass through said orifice, said orifice gradually tapering in a downstream direction of said fluid injection valve, wherein the step of removing material includes grinding said surface of said basic material, and wherein the method further comprises
   projecting light toward said orifice;
   measuring an amount of light passing through said orifice; and
   controlling an amount of material removed in said removing step according to a measured amount of light.

2. A method of manufacturing according to claim 1, wherein the projecting and measuring steps are performed concurrently with the removing step.

3. A method of manufacturing a fluid injection valve having a needle body including an injection port at one end thereof and a needle selectively opening and closing said injection port, said method comprising the steps of:

pressing an orifice into a basic material to form an orifice plate; and disposing said orifice plate at a point on a downstream side of said injection port to permit fluid from said fluid injection valve to pass through said orifice, wherein the method further comprises:
   punching said basic material with a punch;
   forming a protective layer on a surface of said basic material;
   removing material from a surface of said basic material to form an opening portion of said orifice; and
   removing said protective layer.

4. A method of manufacturing a fluid injection valve having a needle body including an injection port at one end thereof and a needle selectively opening and closing said injection port, said method comprising the steps of:

pressing an orifice into a basic material to form an orifice plate; and disposing said orifice plate at a point on a downstream side of said injection port to permit fluid from said fluid injection valve to pass through said orifice, wherein the method further comprises
   projecting light toward said orifice;
   measuring an amount of light passing through said orifice;
   controlling an amount of material removed in the removing step according to a measured amount of light.

5. A method of manufacturing according to claim 4, wherein the measuring step includes using at least one photosensitive element to detect said amount of light.

6. A method of manufacturing according to claim 5, wherein said at least one photosensitive element includes a plurality of photosensitive elements each having a longitudinal axis substantially perpendicular to a longitudinal axis of said orifice.

7. A method of manufacturing according to claim 5, wherein said at least one photosensitive element has a longitudinal axis substantially coincident with a longitudinal axis of said orifice.

8. A method of manufacturing according to claim 5, wherein said at least one photosensitive element includes a first photosensitive element having a longitudinal axis substantially coincident with a longitudinal axis of said orifice and a second photosensitive element having a longitudinal axis substantially perpendicular to said longitudinal axis of said orifice.

9. A method of manufacturing a fluid injection valve having a needle body including an injection port at one end thereof and a needle selectively opening and closing said injection port, said method comprising the steps of:

pressing an orifice into a basic material to form an orifice plate; and disposing said orifice plate at a point on a downstream side of said injection port to permit fluid from said fluid injection valve to pass through said orifice, wherein the method further comprises:
   punching said basic material with a punch;
   forming a protective layer on a surface of said basic material;
   removing material from a surface of said basic material to form an opening portion of said orifice;
   removing said protective layer; and
   pressing said punched basic material around said orifice with a second punch.

10. A method of manufacturing a fluid injection valve having a needle body including an injection port at one end thereof and a needle selectively opening and closing said injection port, said method comprising the steps of:

providing a basic material having a plate shape;

punching said basic material with a punch having a shape which forms an orifice therein thereby defining an orifice plate;

removing material from a surface of said basic material to form an opening portion of said orifice;

disposing said orifice plate at a point on a downstream side of said injection port to permit fluid from said fluid injection valve to pass through said orifice, said orifice gradually tapering in a downstream direction of said fluid injection valve;

projecting light toward said orifice;

measuring an amount of light passing through said orifice; and controlling an amount of material removed in said removing step according to a measured amount of light.

* * * * *